(12) United States Patent
Mori

(10) Patent No.: US 6,352,663 B1
(45) Date of Patent: Mar. 5, 2002

(54) METHOD OF MANUFACTURING WOODGRAINED MEMBER

(75) Inventor: Hiroki Mori, Aichi-ken (JP)

(73) Assignee: Kabushiki Kaisha Tokai-Rika-Denki Seisakusho, Aichi-ken (JP)

( * ) Notice: Subject to any disclaimer, the term of this patent is extended or adjusted under 35 U.S.C. 154(b) by 0 days.

(21) Appl. No.: 09/650,816

(22) Filed: Aug. 30, 2000

Related U.S. Application Data

(62) Division of application No. 09/341,470, filed as application No. PCT/JP98/05458 on Dec. 3, 1998, now Pat. No. 6,138,526.

(30) Foreign Application Priority Data

Dec. 4, 1997 (JP) .............................. 9-334030
May 6, 1998 (JP) ............................ 10-123641

(51) Int. Cl.[7] .............................. B29C 45/14
(52) U.S. Cl. ................. 264/129; 264/246; 264/255
(58) Field of Search ................ 264/250, 255, 264/135, 246, 129

(56) References Cited

U.S. PATENT DOCUMENTS 5,075,052 A * 12/1991 Malvassora ................ 264/46.7
5,676,899 A * 10/1997 Mrozinski et al. .......... 264/226

FOREIGN PATENT DOCUMENTS

| JP | 59-11963 | 1/1984 |
| JP | 61-272221 | 12/1986 |
| JP | 63-270279 | * 11/1988 |
| JP | 2-222755 | 9/1990 |
| JP | 4-216020 | 8/1992 |
| JP | 4-327928 | 11/1992 |

OTHER PUBLICATIONS

International Search Report.

* cited by examiner

Primary Examiner—Jan H. Silbaugh
Assistant Examiner—Edmund H. Lee
(74) Attorney, Agent, or Firm—Nixon Peabody LLP; Thomas W. Cole

(57) ABSTRACT

A woodgrained member having at least a color clear layer 22 on a surface of a woodgrained urethane-based member 16, comprises concave portions formed at the surface of the urethane-based member 16, a wood filler 20 embedded into the concave portions and a color clear layer 22 provided on the surface of the urethane-based member into which the wood filler 20 has been embedded, wherein the depth of the concave portions is 0.02 mm ~0.1 mm The urethane-based member 16 which has above structure and has a Shore A hardness of 75 or more, a Shore D hardness of 20 or more, an extensibility of 80~300%, and a density of 0.3~0.9 g/cm$^3$ is a steering wheel.

1 Claim, 4 Drawing Sheets

METHOD OF MANUFACTURING WOODGRAINED MEMBER

This application is a divisional application of U.S. Ser. No. 09/341,470 filed Jul. 12, 1999 now U.S. Pat. No. 6,138,526, which is a 371 of PCT/JP98/05458.

TECHNICAL BACKGROUND

Although natural wood has been used for woodgrained sing wheels, there are drawbacks in that natural wood is difficult to form in a complicated product shape and there is the fear of cracks being generated in the wood due to deforming in a collision On the other hand, a steering wheel, which comprises of a woodgrained urethane mold, has been suggested. For example, Japanese Patent Laid-Open (JP-A) No. 63-270279 discloses a method of manufacturing a woodgrained steering wheel comprising the steps of manufacturing a matrix having a woodgrain pattern from natural wood, producing a urethane mold via the matrix, and applying the same color as that of the natural wood to a surface of the urethane mold.

As concave portions formed in the matrix having the woodgrain pattern formed by the above method have grains 30 corresponding to those of genuine wood (natural wood) as shown in FIG. 5, the depth of these grains 30 is as shallow as 0.02 mm or less, the depth of each of the grains is not uniform and a corner portion made by the grain matrix surface and the concave portion of the grain is formed in an R shape.

For his reason, a wood filler having the same color as that of the natural wood is embedded into grain portions. When the excess wood filler is wiped off, a small amount of the wood filler remains near the R-shaped corner portion so that border lines of the woodgrain become blurred. Moreover, the amount of wood filler embedded into the grain portions is variable and portions, whose colors are different from those of the woodgrain, are generated. As a result, it is difficult to realize the woodgrain Therefore, a first object of the present invention is to provide a woodgrained member such as a woodgrained steering wheel or the like which has an excellent appearance of wood and a feeling of wood.

A second object of the present invention is to provide a method of manufacturing the woodgrained member in which the woodgrained member such as a steering wheel or the like which has the above-described properties can be reliably and easily manufactured.

DISCLOSURE OF THE INVENTION

The present invention discloses a woodgrained member composing concave portions formed at a surface of a urethane-based base member, a wood filler embedded into the concave portions, and a color clear layer provided at a surface of the urethane-based base member into which the wood filler has been embedded, wherein the depth of the concave portions is 0.02 mm ~0.1 mm Desirably, a corner portion made by a surface of the urethane-based base member and the concave portions and a corner portion of a bottom portion of the concave portions are formed in an angular shape, and the depths of the concave portions are substantially the same.

In the case of a steering wheel, the urethane-based member has a Shore A hardness of 75 or more, a Shore D hardness of 20 or more, an extensibility of 80~300%, and a density of 0.3~0.9 g/cm³. Particularly desirable are a Shore A hardness of 85~95, a Shore D hardness of 30~40, an extensibility of 100~200%, and a density of 0.40.5 g/cm³.

In addition, the present invention discloses a method of manufacturing a woodgrained member comprising: a first step of forming an in-mold coating layer with a mold in which a woodgrain pattern has been formed; a second step of injecting a urethane-based composition into the mold; a third step of removing a urethane mold having a woodgrain formed by the hardening of the urethane composition from the mold; and a fourth step of filing the woodgrain portions with a wood filler containing a coloring member and then providing a color clear layer over the layer including the wood filler.

DESCRIPTION OF THE PREFERRED EMBODIMENTS

A preferred embodiment of the present invention will be explained below. An embodiment of a woodgrained member will be described below using a steering wheel as a particular example.

Figure 1:
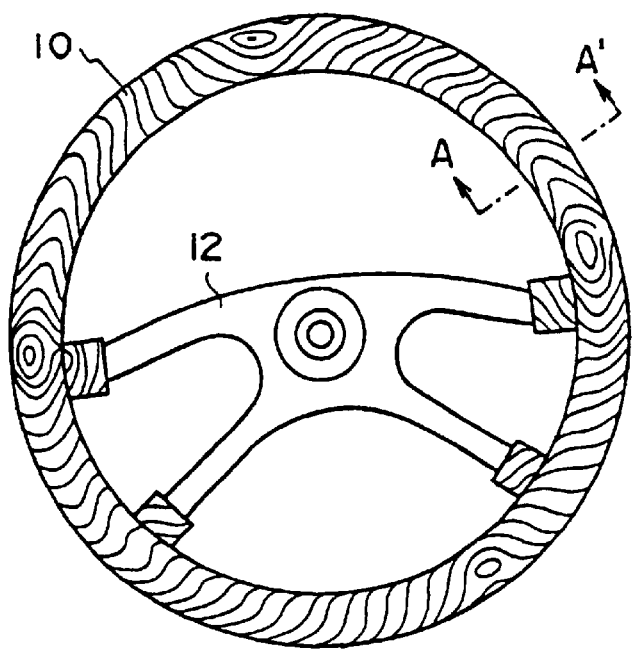
FIG. 1 is a schematic structural view illustrating one preferred embodiment of a woodgrained steering wheel of the present invention.
Figure 2:
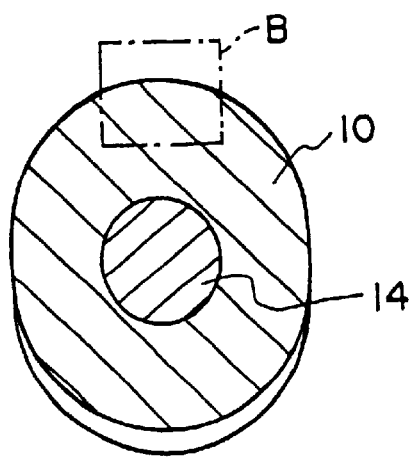
FIG. 2 is a sectional view taken along a line A–A' in FIG. 1.

FIG. 1 is a schematic structural view illustrating one preferred embodiment of a woodgrained steering wheel of the present invention. In FIG. 1, a spoke portion 12 is connected to an annular urethane mold 10. The urethane mold 10 is structured in such a manner that, as shown in FIG. 2, a rim portion core member 14 is disposed within an inner portion thereof.

Figure 3:
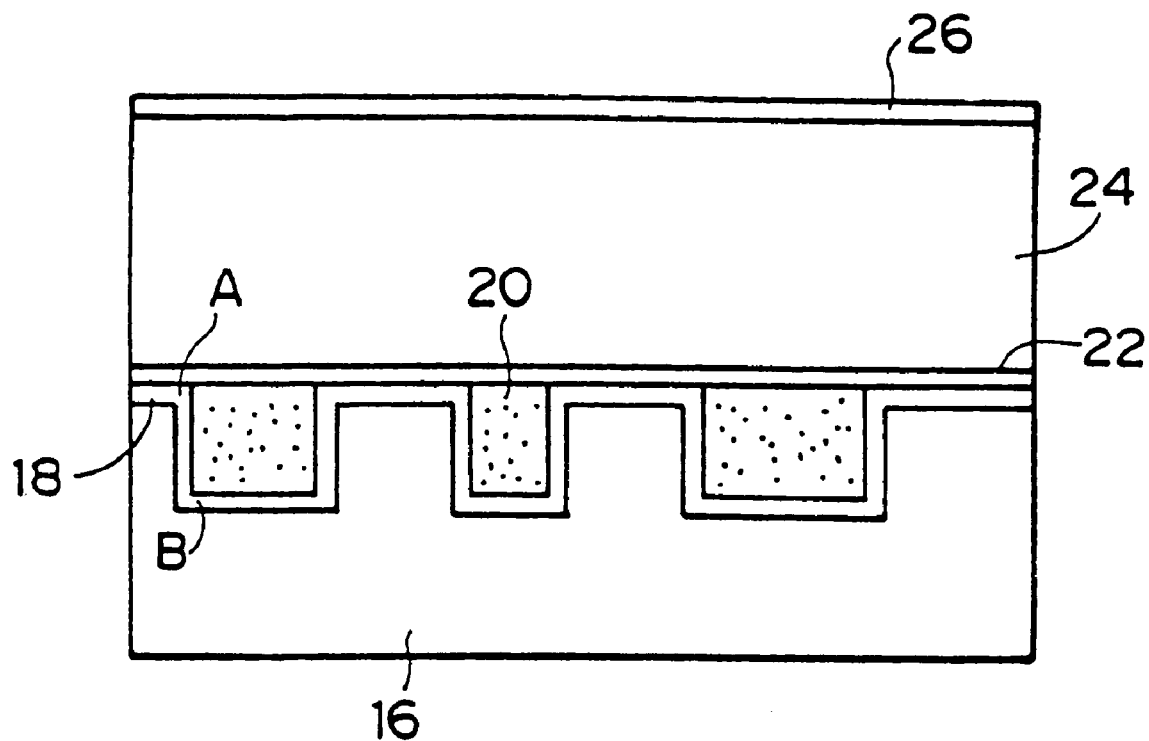
FIG. 3 is an enlarged detail view of the main portion of FIG. 2.

The surface side of the urethane mold 10 consists of a urethane base member 16, an in-mold coating layer 18, a wood filler portion (conduit portion) 20, a color clear layer 22, an intermediate coating clear layer 24, and an overcoating clear layer 26, as shown in FIG. 3. The urethane base member 16 has a Shore A hardness of 75 or more, a Shore D hardness of 20 or more, an extensibility of 80~300%, and a density of 0.3~0.9 g/cm³, and preferably, a Shore A hardness of 85~95, a Shore D hardness of 30~40, an extensibility of 100%~200% and a density of 0.4~0.5 g/cm³.

Shore A hardness here means a hardness indicated by JIS K-6253 type A and Shore D hardness means a hardness indicated by JIS K-253 type D.

When the urethane base member 16 has a Shore A hardness of 75 or more, a Shore D hardness of 20 or more and a density of 0.3~0.9 g/cm³, the texture is dose to that of wood. When the urethane base member 16 has a Shore A hardness of 85~95, a Shore D hardness of 30~40 and a density of 0.4~0.5 g/cm³, the texture is even closer to that of wood. However, in view of reliably preventing damage or the like of the sing wheel in a collision, the extensibility of the urethane base member 16 is to be 80~300%, and more preferably 100~200%.

To produce the urethane base member 16 which has the above-mentioned properties, there is a method in which a polyol component and an isocyanate component are chosen as desired and the proportion of cross-linking agent used (for example, ethylene glycol or the like) is greater than the conventional proportion.

As the polyol component for producing the urethane base member 16 of the present invention, polyether polyol, polyester polyol or the like can be used and polyether polyol is particularly preferable. Among polyether ployols, trifunctional polyether polyol is preferable because it increases the hardness of the urethane base member and the extensibility.

As the isocyanate component, a tolylenediisocyanate (TDI) and a diphenylmethane diisocyanate (MDI) can be used. Among these isocyanate components, a diphenylmethane diisocyanate (MDI) is preferable because it increases the hardness of the urethane base member, has decreased toxicity, and shows an excellent extensibility. A prepolymer modified MDI, a polymeric modified MDI, a carbodiimido modified MDI, a pure MDI or the like can be optionally mixed with the diphenylmethane diisocyanate (MDI) in accordance wit the intended physical properties.

To produce the urethane base member 16 of the present invention, in addition to the polyol component and the isocyanate component, a cross-linking agent, a catalyst, a foaming agent, a cell stabilizer and the like can be used. Optionally, a flame retarder or the like can be mixed therein.

As the cross-linking agent for example, low molecular weight polyol such as ethylene glycol, diethylene glycol, butanediol, dipropylenediol, trimethylolpropane, glycerne, or the like, amine-based low molecular polyol such as triethanolamine, ditriethanolamine or the like, aliphatic amines, and alicyclic amines can be used. Catalysts include, for example, tertiary amines such as triethylenediamine, triethylamine, N-methylmorpholine, N-ethylmorpholine or the like, tin (I) octenoate, tin (II) dibutyllaurate or the like. The foaming agents include, for example, water, alkane halides such as trichloromonofluorometne, dichloromonofluoromethane or the like, azobisisobutyronitile or the like.

To produce the urethane base member 16 of the present invention, it is also important to determine the mixing ratios of the polyol component and the isocyanate component. These mixing ratios should be determined in accordance with the intended physical properties of the urethane base member. For example, it is desirable that the mixing ratio of the polyol component/the isocyanate component is 90~110/113~133.

In FIG. 3, as the in-mold coating layer 18 becomes a base color of the color realized in the steering wheel, desirably, it includes pigments having high hiding power and comprises non-yellowing urethane coating member. The desirable thickness of the in-mold coating layer is 10~20 $\mu$m.

In FIG. 3, the reference numeral 20 indicates a wood filler portion (conduit portion) into which the wood filler which contains the color member has been filled. As the wood filler, an aqueous wood filler, a oil wood filler, and a synthetic resin wood filler can be used, however, the synthetic resin wood filler is preferable. As the synthetic resin wood filler, a two-liquid polyurethane coating member is effective.

In the color clear layer 22, a hue exhibiting the intended feeling of wood is formed by the complementary color effect based on the arising from the relation between the color clear layer 22 and the base color which comprises the in-mold coating layer 18. Accordingly, the polyurethane-based coating member, the two-liquid polyurethane-based coating member or the like is used as the color clear layer 22 so as to form a transparent color. The thickness of the color clear layer 22 is desirably 10~30 $\mu$m.

As the intermediate coating clear layer 24, a transparent urethane-based coating member or a polyester-based coating member paint which gives a pleasant appearance of having a good thickness can be used and to impart the texture of wood to the urethane mold 10. The thickness of the intermediate coating clear layer 24 is preferably 50~500 $\mu$m.

The overcoating clear layer 26 is provided to impart surface physical properties to the urethane mold 10 and any components therefor can be used in accordance with the intended physical properties of the surface. For example, various urethane-based coating members can be used which have properties such as high light-resistance, the ability to cut out ultraviolet light, water-resistance, chemical-resistance or the like. The thickness of the overcoating clear layer 26 is preferably 10~50 $\mu$m.

Figure 4:
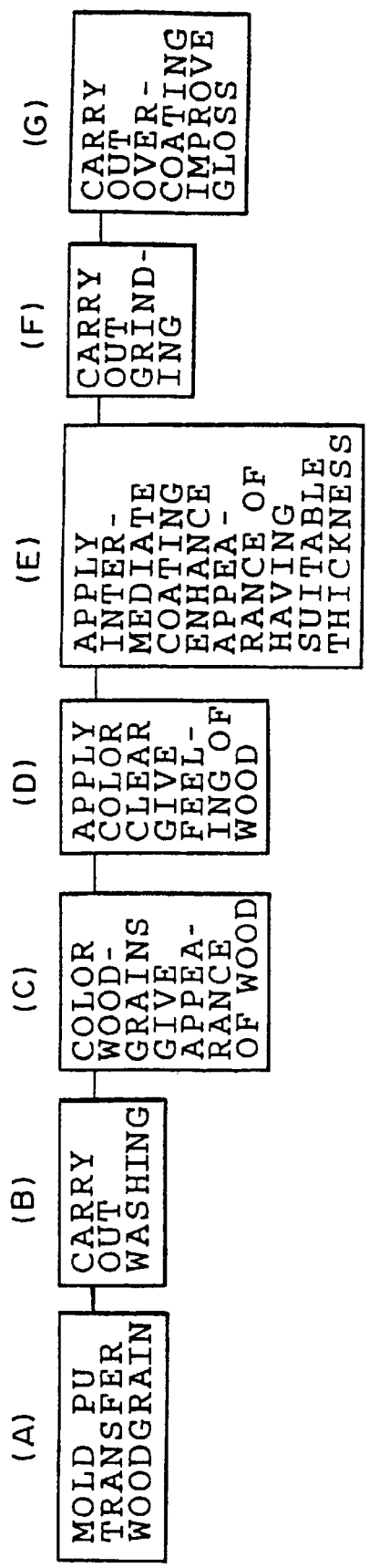
FIG. 4 is a process view illustrating one preferred embodiment of the woodgrained steering wheel production method of the present invention.
Figure 5:
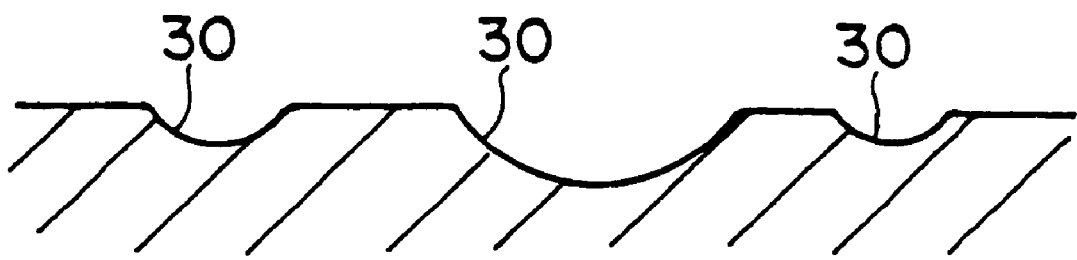
FIG. 5 is a sectional view illustrating a shape of grains of a natural wood (a genuine wood).

FIG. 4 is a process diagram illustrating a preferred embodiment of a method of manufacturing a woodgrained steering wheel of the present invention. First, a woodgrain pattern is directly provided by an etching process or the like onto a steel or aluminum mold which has been cut or cast into the shape of the steering wheel.

Next, an in-mold coating is applied to the inner surface of the mold in which the woodgrain pattern has been formed by the above-described step so as to form an in-mold coating layer onto which the woodgrain pattern has been transferred. In this case, before applying the in-mold coating, a releasing agent or the like is optionally applied to the inner surface of the mold.

Next, after setting a rim portion core member or the like at a predetermined position of the mold, a urethane-based composition is injected into the mold In this way, because the urethane-based composition is injected into the inner surface of the mold in which the woodgrain pattern has been formed after the in-mold coating is applied to the inner surface of the mold, a layer of the urethane coating member adheres to the surface of the molding. As air bubbles are not generated from the urethane mold at the time of coating, an attractive woodgrained product can be attained. Subsequently, after the injection of the urethane-based composition, it is left for a predetermined time to harden. As a result, the urethane mold is formed (step A in FIG. 4).

The width and length of grams formed at the surface of the urethane-based mold may be same as that of genuine wood. However, it is desirable that the depth of the grains (the depth of the concave portions) is 2~5 times, and preferably 3~4 times as deep as the depth of the woodgrains of genuine wood. At the same time the depth of a plurality of the grains is desirably as uniform as possible. Accordingly, the depth of the woodgrains is 0.02~0.1 mm, and preferably 0.06~0.08 mm. Corner portions of the grain portions are desirably formed in a angular shape.

When the depth of the woodgrains is less than 0.02 mm, it is difficult to color the woodgrain because when the wood filler, which will be described hereafter, is embedded into the woodgrains and the excess wood filler is wiped off, the wood filler does not remain in the grain portions. As a result, it is difficult to color the woodgrains and impart the appearance of wood. On the other hand, when the depth of the woodgrains is over, 0.1 mm, at the time of etching to apply the grains to the mold, corner portions of the grains of the mold are formed in an R round shape. Accordingly, the corner portions (shown by a letter A in FIG. 3) made by the surface of the urethane-based mold and the upper end portion of the grain portions (concave portions) and the corner portions (shown by a letter B in FIG. 3) of the bottom portion of the grain portions (the concave portions) are formed in an R shape, and some amount of wood filler remains at the R portions, so that boundary lines of the woodgrain become blurred. As a result, it is difficult to achieve sharp woodgrains, which is not preferable. Moreover, when the depths of a plurality of grain portions are excessively different from each other, the amounts of the wood filler in the grain portions are different, and the colors of the grain portions are different, so that it is difficult to achieve a woodgrain effect. Subsequently, the urethane mold is removed from the mold and washed. In the washing step, to remove the releasing agent, oils or the like which have adhered to the surface of the urethane mold, a rinsing method using various detergents and a washing method using an organic solvent are effected (step B in FIG. 4)

Next, the woodgrains formed in the surface of the urethane mold are filled with a filler containing a coloring member to give the appearance of wood, so that the conduit portions of the woodgrain stand out from the wood portion (step C in FIG. 4).

After applying the color clear layer to achieve the feeling of wood (step D in FIG. 4), the mediate coating clear layer is applied to enhance the appearance of having a suitable thickness (step E in FIG. 4). Thereafter, the surface of the intermediate coating layer is ground (step F in FIG. 4).

Although the grinding method is not especially restricted, a grinding method using sandpaper is desirable.

Next, the overcoating clear layer which is comprised of an optional urethane-based component is formed at the surface of the ground intermediate coating layer in accordance with the required properties of the urethane mold (step G in FIG. 4).

In the above-described embodiment, an explanation was given for a steering wheel in particular. However, the woodgrained member of the present invention can be used for interior members in an automobile (for example, a center panel (i.e., a panel for air conditioning switches or the like), a door side panel, a shift lever knob, a window switch panel a lever combination switch (i.e., a switch for a wiper or a light), a knob or the like) and for interior members in a house (for example, a door knob or a light) or the like. The woodgrained member, as long as structured as described above, exhibit an excellent appearance of wood and the feeling of wood and there is no possibility of cracking due to deformation of the members when used for members other than steering wheel.

EXAMPLES

An example of the present invention will be explained below.

Example 1

A woodgrain pattern was etched into a mold comprising steel which has been cut and cast into the shape of a steering wheel. The depth of the grains was 0.06 mm. An in-mold coating which was comprised of a urethane coating member was applied to a design surface within the mold (the surface in which the woodgrain had been formed). As a result of applying the in-mold coating, an in-mold coating layer having a thickness of 15 μm was provided by a non-yellowing urethane coating member (IPDI urethane coating member) which was produced using a pigment having a high hiding power (Ozley MV: manufactured by DIC Inc.). After disposing a rim portion core member and a spoke portion core member at predetermined positions within the mold, a urethane resin solution, which was comprised of the composition described below which was to be an urethane-based member, was injected thereinto.

[Composition of Polyol]

Trifunctional polyetherpolyol (MW=5,000~7,000)

Trifunctional polyetherpolymerpolyol (MW=5,000~7,000)

Cross-linking agent ethylene glycol

Catalyst: 1. DABCO-EG(manufactured by Sankyro Air Products Inc.)
2. TOYOCAT-ET(manufactured by Tosohi Corp.)

Antioxidant

Foaming agent water

[Composition of isocyanate]

Prepolymer modified MDI

Polymeric MDI

Carbodiimido modified MDI

Pure MDI

The urethane resin solution was produced in such a manner that a mixing weight ratio of the above polyol-based composition/the above isocyanate-based composition was 100/122.

Next, after injecting the urethane resin solution into the mold, it was left for approximately 70 seconds so as to harden. Thereafter, it was removed from the mold.

The physical properties of the urethane resin layer produced from the urethane resin solution was as follows.

(1) Shore A hardness: 85

(2) Shore D hardness: 30

(3) Extensibility: 120%

(4) Density 0.45 g/cm$^3$ (5) Tensile strength: 8 MPa

Next, as the releasing agent and oils were adhered to the surface of the steering wheel which was removed from the mold and which had the urethane resin layer on the surface, the surface was washed with a petroleum-based solvent.

Thereafter, a wood filler which was comprised of a two-liquid polyurethane coating member Romen filler (manufactured by Mikuni Paint Corp.) was applied to the woodgrains with a brush. Then the filler was rubbed into the woodgrains using a waste cloth while the excess coating member was wiped off.

Next, a color clear layer having a thickness of 20 μm was formed on the surface of the urethane resin layer using a semi-transparent non-yellowing urethane coating member (IPDI urethane coating member), which was comprised of a pigment having a high transparency (Ozley MV color manufactured by DIC Inc.). By the complementary color effect of the hue of the color clear layer and the hue of the in-mold coating layer, a unique woodgrain hue was exhibited.

On the color clear layer, a non saturated polyester clear (which was manufactured by Mikuni Paint Corp.) or a two-liquid polyurethane coating member was applied once or twice so as to provide an intermediate coating clear layer having a thickness of approximately 300 μm. After grinding the surface of the intermediate coating clear layer with #600 sandpaper, an overcoating clear layer, which was comprised of the two-liquid polyurethane coating solution (which was manufactured by Mikuni Paint Corp.) and had a thickness of 30 μm, was formed on the intermediate coating clear layer.

The urethane steering wheel manufactured in the above described manner showed preferable properties in Shore hardness, extensibility, density and the like. Moreover, it showed an excellent resistance to crack formation due to deforming in a collision. The conduit portions of the woodgrains stood out in strong contrast from the surface of wood so that the excellent appearance of wood and the feeling of wood were exhibited.

EFFECTS OF THE INVENTION

According to the present invention, as a woodgrained member comprises concave portions formed at a surface of a urethane-based member, wood filler embedded into the concave portions and a color clear layer provided at a surface of the urethane-based member into which the wood filler has been embedded, a woodgrained member which has an excellent appearance of wood and a feeling of wood and in which there is no possibility of breakage in the urethane due to deformation of the member can be provided.

When a corner portion made by a surface of the urethane member and the concave portions and a corner portion of a bottom portion of the concave portions are formed in a angular shape, the woodgrained portions are reliably filled with the wood filler, so that the woodgrain can be reliably represented.

Further, when gram depth of a plurality of the woodgrains are substantially the same, the color of the grain portions becomes the same color as that of the woodgrains so that the woodgrains can be reliably realized.

When the urethane-based member has a Shore A hardness of 75 or more, a Shore D hardness of 20 or more, an extensibility of 80~300%, and a density of 0.3~0.9 g/cm$^3$, the swing wheel, which has the appearance of wood and the feeling of wood and in which there is no possibility of breakage in the urethane due to deforming of the member, can be provided.

Further, when the urethane-based member has a Shore A hardness of 85~95, a Shore D hardness of 30~40, an extensibility of 100~200%, and a density of 0.4~0.5 g/cm$^3$, the effects, in which the urethane-based member has the appearance of wood and the feeling of wood and there is no possibility of breakage in the urethane due to deforming of the member, can be enhanced.

As the present invention comprises a first step of forming an in-mold coating layer within a mold in which a woodgrain pattern has been formed, a second step of injecting a urethane-based composition into the mold, a third step of removing a urethane mold having a woodgrain, formed by the hardening of the urethane composition from the mold; and a fourth step of filling the woodgrain portions with a wood filler containing a coloring member and then providing a color clear layer over the layer including the wood filler, the woodgrained member such as the steering wheel or the like which has the excellent appearance of wood and the feeling of wood and has no possibility of being cracked due to deforming of the steering wheel at the time of a collision of an automobile or the like, can be reliably and easily manufactured.

What is claimed is:

1. A method of manufacturing a woodgrained member comprising the steps of:

forming a woodgrain pattern within a mold;

forming an in-mold coating layer within an inner surface of said mold in which a woodgrain pattern has been formed, said in-mold coating layer having a woodgrain pattern thereon which corresponds to said woodgrain pattern of said mold;

injecting a urethane-based composition into said mold in which said in-mold coating layer has been formed so as to form a urethane base member which adheres to said coatings layer, said urethane base member having concave portions at a surface thereof;

removing said urethane base member and said in-mold coating layer from said mold after said urethane base member has hardened;

filling said concave portions of said woodgrain pattern of said in-mold coating layer with a wood filler containing a coloring member, and then providing a color clear layer over said wood filler and said in-mold coating layer.

* * * * *